United States Patent [19]
Cotten et al.

[11] 4,391,941
[45] Jul. 5, 1983

[54] STABILIZED POLYPROPYLENE COMPOSITIONS

[75] Inventors: George R. Cotten, Lexington; Avrom I. Medalia, Newton, both of Mass.

[73] Assignee: Cabot Corporation, Boston, Mass.

[21] Appl. No.: 303,706

[22] Filed: Sep. 18, 1981

Related U.S. Application Data

[63] Continuation-in-part of Ser. No. 87,744, Oct. 24, 1979, abandoned.

[51] Int. Cl.³ ............................................. C08K 3/04
[52] U.S. Cl. .................................... 524/495; 524/291
[58] Field of Search ................................ 524/495, 496

[56] References Cited
U.S. PATENT DOCUMENTS

| | | | |
|---|---|---|---|
| 3,244,667 | 4/1966 | Burgess | 524/137 |
| 3,464,943 | 9/1969 | Newland et al. | 524/91 |
| 3,502,613 | 3/1970 | Berger | 524/291 |
| 3,830,774 | 8/1974 | Jordan et al. | 524/495 |
| 3,959,413 | 5/1976 | Schwarzenbach et al. | 260/927 R |
| 4,075,156 | 2/1978 | Johnson | 524/496 |
| 4,097,656 | 6/1978 | Dany et al. | 524/495 |
| 4,216,137 | 8/1980 | Wang et al. | 525/149 |
| 4,287,117 | 9/1981 | Theysohn et al. | 524/496 |
| 4,321,162 | 3/1982 | Guffens et al. | 524/495 |

Primary Examiner—Morton Foelak
Assistant Examiner—R. A. White
Attorney, Agent, or Firm—Jack Schuman; Lawrence A. Chaletsky; Robert J. Feltovic

[57] ABSTRACT

This disclosure relates to the use of certain heat-treated carbon blacks as stabilizers against the effects of degradation caused by visible and ultraviolet light in the preparation of polypropylene resin compositions containing conventional antioxidants which impart thermal stability to the polypropylene resin.

6 Claims, No Drawings

STABILIZED POLYPROPYLENE COMPOSITIONS

This application is a continuation-in-part of copending application Ser. No. 87,744, filed Oct. 24, 1979, now abandoned.

This invention relates to new and improved thermally stabilized polypropylene resin compositions containing carbon blacks. More particularly the invention is concerned with thermally stabilized polypropylene resin compositions containing certain carbon blacks which impart stabilization against degradation caused by visible and ultraviolet light while minimizing the adverse effects on thermal stability normally associated with the use of untreated carbon blacks.

Polypropylene resin is a relatively lightweight thermoplastic material which has a high degree of impact strength. The polypropylene material is widely used in various applications, such as for example, in the manufacture of foils, films, fibers, molded articles, automotive products, household and industrial equipment, toys, shoe heels, luggage, wire and cable coatings, pipes and the like. The conventional techniques of injection molding, extrusion and vacuum forming are all suitable methods for fabricating articles made from polypropylene materials.

Pure polypropylene is rapidly oxidized at elevated temperatures. For commercial usage, the polypropylene must be "thermally stabilized", by addition of suitable antioxidants. There are many such suitable antioxidants as is evident by reference to the chart of antioxidants appearing on pages 654 and 655 of the McGraw-Hill Publication entitled "Modern Plastics Encyclopedia Engineering Data Bank Buyers' Guide", volume 53, number 10A, 1976-1977 edition. For purposes of the present invention any conventional, well known antioxidant suitable for thermally stabilizing the polypropylene resin may be utilized. A major disadvantage of the thermally stabilized polypropylene materials, however, is the deterioration and degradation thereof caused by exposure to visible and ultraviolet light. Accordingly, it is customary to incorporate into the polypropylene resins certain additives, i.e., stabilizers, which serve to minimize or prevent the deterioration and degradation resulting from exposure to visible and ultraviolet light.

In particular, it is well-known, for example, to incorporate materials, such as carbon black, as stabilizers which convert harmful untraviolet radiation into harmless infrared radiation. However it has been further recognized that the thermal stability of thermally stabilized polypropylene resins is drastically reduced when even small amounts of carbon blacks are incorporated into the resin as stabilizers against the effects of visible and ultraviolet light.

It is accordingly an object of the present invention to provide new and improved polypropylene resin compositions.

It is a further object of this invention to provide novel resin compositions comprising polypropylene, conventional thermal stabilizers and a certain class of heat treated furnace carbon blacks as visible and ultraviolet light stabilizers.

A still further object is to provide new resinous compositions having desirable physical properties and which are characterized by a minimizing of the adverse effects normally associated with incorporation of carbon blacks into thermally stabilized polypropylene resins.

Other objects and advantages of the present invention will be apparent to those skilled in the art from the following detailed description and claims.

In accordance with this invention, it has been found that the above and still further objects are achieved by incorporating polypropylene, conventional thermal stabilizers therefor and furnace carbon blacks which have been heat treated in the manner set forth hereinafter.

Generally speaking, an amount of the above-mentioned heat treated carbon black sufficient to stabilize a thermally stabilized polypropylene resin against deterioration resulting from exposure to visible or ultraviolet light is added to the polypropylene. More particularly, the light stabilizer additive of the present invention is used in amounts of from about 0.1 to about 2.0 percent by weight based on the weight of the thermally stabilized polypropylene. However, it is preferred to use an amount of from about 0.25 to about 1.0 percent by weight based on the weight of the thermally stabilized polypropylene.

The heat treated furnace carbon blacks utilized herein as stabilizers for polypropylene against the effects of visible and ultraviolet light are readily prepared by methods well known in the art. For example, the heat treated blacks of the present invention may be obtained by subjecting any furnace carbon black to a temperature of from about 1200° to about 3000° C. under a non-oxidizing atmosphere. A non-oxidizing atmosphere is required since at these temperatures carbon burns forming carbon monoxide and carbon dioxide, in the presence of air and many chemical oxidants. The heat treatment must therefore be carried out in a non-oxidizing atmosphere, i.e., in the absence of oxygen and chemical oxidants. Such an atmosphere may consist of nitrogen, the rare gases (helium, argon, etc.), or reducing gases such as hydrogen, carbon monoxide. It is also satisfactory to carry out the heat treatment under a high vacuum. In a suitably designed container which permits the escape of gases but restricts admission of gases, carbon black can be heated without first purging with a non-oxidizing gas since the small amount of carbon monoxide driven off from the carbon black on heating or formed by reaction with trapped air will provide a non-oxidizing atmosphere. Further information on this subject is found in an article by W. D. Schaeffer, W. R. Smith and M. H. Polley, appearing in "Industrial and Engineering Chemistry," 45, 1721 (1953).

The conditions for carrying out the heat treatment are maintained such as to ensure that the entire sample of the black being treated reaches the desired minimum temperature. Further description of the preparatory process is found in the working examples. As a result of this there is produced a heat treated furnace black which is useful in the stabilization of thermally stabilized polypropylene against the deleterious effects of visible and ultraviolet light and which minimizes the adverse effects on the thermal stabilization normally caused when untreated carbon blacks are utilized as light stabilizers.

The stabilized polypropylene resin compositions of this invention are readily prepared by conventional mechanical methods. The polypropylene, antioxidants and stabilizers are intimately admixed together on a conventional mixing machine of the type normally used for mixing rubber or plastics such as a two roll-mill, an extruder, or a Banbury mixer. Regardless of the method by which the mixing of these materials is achieved, it is necessary that the materials be mixed together or worked under a sufficient heat and pressure to insure an efficient dispersion of the additives in the polypropylene so as to form a homogeneous resin composition.

The invention will be more readily understood by reference to the following examples which describe the advantageous results achieved by the use of the visible and ultraviolet light stabilizers of the present invention when incorporated into thermally stabilized polypropylene resin. There are, of course, many other forms of this invention which will become obvious to one skilled in the art once the invention has been fully disclosed, and it will accordingly be recognized that these examples are given for the purpose of illustration only, and are not to be construed as limiting the scope of this invention in any way.

The following testing procedures are used in evaluating the analytical properties of the blacks used as visible and ultraviolet light stabilizers and in evaluating the efficiency of the blacks as stabilizers for thermally stabilized polypropylene.

Nitrogen Surface Area—The nitrogen surface area of a carbon black is determined in accordance with ASTM Test Method D3037-76, Method C, and is expressed in terms of square meters per gram ($m^2/g$).

DBP Absorption—The dibutyl phthalate (DBP) absorption number of a carbon black is determined in accordance with ASTM Test Method D2414-76. The results reported are on blacks in pelleted form.

Total Acids—The value reported for total acids, in units of milliequivalents per gram (meq/g), is determined in accordance with the procedure set forth by D. Rivin in "Rubber Chemistry and Technology," 36, 729 (1963). The procedure is based on a reaction with lithium aluminum hydride ($LiAlH_4$) at a temperature of 70° C.

Volatile Loss—In determining the loss of volatile material other than moisture, a platinum crucible having a capacity of 10 to 30 milliliters is filled with a sample of dry carbon black pellets to a level of not more than 2 millimeters below the cover line if the sample is expected to have a volatile content lower than 6 percent; or to a level of not more than 10 millimeters below the cover line if the expected volatile content is above 6 percent. A cover for the crucible equipped with a 1.0 millimeter hole is firmly fitted into place and the crucible, cover and carbon black sample are weighed to the nearest 0.1 milligram. The covered crucible and contents are then heated in an electric furnace for exactly 7 minutes at a temperature of 955°±5° C. The crucible is removed from the furnace and placed in a desiccator where it is allowed to cool to room temperature prior to being weighed to the nearest 0.1 milligram. The percent volatile content is calculated as the percent weight loss of the sample. The calculation may be readily made as follows:

$$V = \frac{(B - C)}{(B - A)} \times 100$$

Where:
V = Volatile content in percent
A = Weight of crucible and cover in grams
B = Weight of crucible, cover and sample before ignition
C = Weight of crucible, cover and sample after ignition Thermal stability—The thermal stability of the polypropylene resin compositions of the present invention is measured in the following manner. A test sample, measuring 4.5×2.0 inches in size, is cut from a sheet having a thickness of 10 mils. The sample is suspended from two racks in a circulating air oven maintained at a temperature of 150° C. If more than one sample is being tested, sheets of aluminum are placed between the samples, but sufficient space is maintained for good air circulation. In addition, all surfaces such as the aluminum sheets, clamps and the like are clean in order to prevent premature failure of the test samples. The samples are inspected daily for evidence of cracking. The onset of cracking is very sudden and the sample usually crumbles to a powdery form within a period of two days following the first visual signs of degradation. The results are reported herein in terms of the number of days to failure as evidenced by the first visual signs of degradation (cracking).

In preparing the formulations of the present invention the following procedure was employed. A Model B Banbury mixer is preheated to a temperature of 300° F. whereupon the polypropylene, thermal antioxidants and light stabilizers are loaded into the mixer. The initial mixing is carried out for 15 seconds at a speed of 77 rpm (No. 1 speed). Thereafter, the speed is increased to 115 rpm for a period of 15 seconds, followed by a further 15 second period of mixing at a speed of 150 rpm. After a further 15 seconds have elapsed, the speed is increased to 230 rpm where it is maintained. When the sample starts fluxing, as recognized by the noise, cold water is turned on and the mixing action is continued for an additional 75 seconds. It has been noted that the sample starts fluxing, ordinarily, approximately after a mixing period of 60 seconds has elapsed from the time of commencing the mixing action. After the mixing is ended, the sample is quickly transferred to a hot two-roll mill, maintained at a temperature of 300°/280° F. and having a roll separation of 60 mils. The material is sheeted out after a single pass, placed on a metal table and cut while still hot into desired 6×6 inch squares with a knife.

The final test samples are prepared by means of a molding procedure utilizing an electrically heated hydraulic press. In particular, the platen temperature is set at 370° F. and the milled sheets are placed in a mold to give sheets of 30 mils thickness. The pressure is maintained at from 5 to 8 tons for a period of 1.5 minutes, following which the pressure is increased to 25 tons for a 3 minute period. At the end of the molding period, the cold water is turned on and the press is opened when the platen temperature is decreased to 200° F. The sheets of 30 mil thickness are removed and cut in half. The molding procedure hereinbefore set forth is then repeated using one-half of the sheet in a 10 mil thick mold to give the final test samples.

EXAMPLE 1

In this example the furnace carbon black utilized has a nitrogen surface area of 565 $m^2/g$, a DBP absorption of 127 cc/100 g, a volatile loss of 2.5% and a total acids content of 1.15 meq/g. The black of the present invention used in this case is the same as this except for having been heat treated at a temperature of 1200° C. The preparation of blacks heat treated at 1200° C. entails placing a suitable sample of black (about 8 grams) into a tube furnace within an alundum boat. The furnace is purged with nitrogen prior to introducing the sample. Thereafter the temperature is raised gradually to 1200° C. and so maintained for a period of one hour. The furnace is then cooled to below 100° C., under nitrogen, and the treated black is removed. The analytical properties of the heat treated black include a volatile loss of 0.9% and a total acids content of 0.72 meq/g. The formulations for testing were prepared by blending unstabilized polypropylene with a sufficient amount of each of the following two thermal antioxidants such that the final compositions contain 0.25% by weight of [thiodiethylene bis-(3,5-di-tert-butyl-4-hydroxy) hydrocinnamate] and 0.1% by weight of (tetrakis [methylene (3,5-di-tert-butyl-4-hydroxyhydrocinnamate)] methane). The carbon black ingredient is incorporated in an amount of 0.25% by weight based on the thermally stabilized polypropylene. Each of the test samples are prepared as described hereinbefore and tested for thermal stability using the method also described earlier herein. The results of the test are given in Table I.

TABLE I

Thermal stability of polypropylene containing thermal antioxidants and a stabilizer against the effects of visible and ultraviolet light.

| Stabilizer (0.25%) | Days to Failure |
| --- | --- |
| None | 120–140 |
| Carbon Black | 22 |
| Heat Treated Carbon Black (1200° C.) | 24 |

EXAMPLE 2

In this example, the furnace carbon black utilized has a nitrogen surface area of 118 m²/g, a DBP absorption of 115 cc/100 g, and a volatile loss of 1.2%. Here, for comparative purposes, the same black is then subjected to heat treatments both at temperatures of 1200° C. and 2700° C. The preparation of blacks heat treated at 1200° C. entails placing a suitable sample of black (about 8 grams) into a tube furnace within an alundum boat. The furnace is purged with nitrogen prior to introducing the sample. Thereafter the temperature is raised gradually to 1200° C. and so maintained for a period of one hour. The furnace is then cooled to below 100° C., under nitrogen and the treated black is removed.

In the case of the heat treatment at 2700° C. the sample is placed in a graphite crucible and heated in an electrically heated furnace. Specifically, a suitable sample of black is placed into a graphite crucible and subjected to a temperature of about 2700° C., in the absence of air, for a period of sufficient duration to ensure that the entire sample has reached the desired minimum temperature of 2700° C. The analytical properties of the black heat treated at 1200° C. include a nitrogen surface area of 114 m²/g while the black treated at 2700° C. has a nitrogen surface area of 90 m²/g and a DBP absorption of 102 cc/100 g. The resin used herein is PRO-FAX 6523 polypropylene. This material is a commercial polypropylene containing thermal antioxidants manufactured and sold by Hercules, Inc. under the registered trademark PRO-FAX 6523. The carbon black incorporated herein as a stabilizer against the effects of visible and ultraviolet light is added in an amount of 0.25% by weight based on the weight of the thermally stabilized polypropylene. The results of the testing for thermal stability are reported in Table II.

TABLE II

Thermal stability of PRO-FAX 6523 polypropylene and a stabilizer against the effects of visible and ultraviolet light.

| Stabilizer (0.25%) | Days to Failure |
| --- | --- |
| None | 120–140 |
| Carbon Black | 20 |
| Heat Treated Carbon Black (1200° C.) | 21 |
| Heat Treated Carbon Black (2700° C.) | 69 |

EXAMPLE 3

In this example, the furnace black utilized has a nitrogen surface area of 118 m²/g, a DBP absorption of 115 cc/100 g, and a volatile loss of 1.2%. To demonstrate the effectiveness of carbon black heat treated through a range of temperatures, this same furnace black is subjected to heat treatments at several selected temperatures from 1200° C. to 2700° C. Each carbon black sample is placed in a graphite crucible and slowly heated, under an argon atmosphere in an induction furnace, to the desired temperature. The sample is maintained at this temperature for at least one hour to ensure that the entire sample has reached the selected temperature. The furnace then is cooled to below 100° C., under argon, and the heat treated black is removed.

The resin used herein is a commercial polypropylene containing thermal antioxidants, manufactured and sold by Hercules, Inc. under the trademark PRO-FAX 6523. The carbon black incorporated herein as a stabilizer against the effects of visible and ultraviolet light is added in an amount of 0.25% by weight based on the weight of the thermally stabilized polypropylene. The results of the thermal stability testing along with selected analytical properties of each of the respective tested blacks is reported below in Table III.

TABLE III

| Stabilizer (0.25%) | DBP cc/100gm | N₂SA m²/gm | Days to Failure Run A | Days to Failure Run B |
| --- | --- | --- | --- | --- |
| Carbon Black | 115 | 118 | 28 | 25 |
| Heat Treated Carbon Black @ 1200° C. | 115 | 104 | 37 | |
| Heat Treated Carbon Black @ 1350° C. | 114 | 111 | 41 | |
| Heat Treated Carbon Black @ 1500° C. | 111 | 112 | | 42 |
| Heat Treated Carbon Black @ 1800° C. | 111 | 101 | | 48 |
| Heat Treated Carbon Black @ 2200° C. | 110 | 96 | | 53 |
| Heat Treated Carbon Black @ 2700° C. | 104 | 94 | | 55 |

From the above data it can be seen that the normal effect caused by incorporating standard furnace carbon blacks as visible and ultraviolet light stabilizers into a thermally stabilized polypropylene is a drastic reduction of the thermal stability of the polypropylene. The data further shows that the use of the heat treated furnace carbon blacks reduces the adverse effects accompanying the standard furnace blacks and in some instances more than triples the useful life of the compound.

For many purposes, it may be desirable to blend other conventional additives with the polypropylene compositions of the present invention. For example, the compositions may be modified by incorporating therewith inert fillers such as glass fibers, ground asbestos, mica and the like, dyes, pigments, plasticizers, reinforcing materials, extruding agents, extenders, and the like. It will be apparent that compositions containing such other additives are within the scope of this invention.

While this invention has been described with respect to certain embodiments, it is not so limited, and it should be understood that variations and modifications thereof may be made which are obvious to those skilled in the art without departing from the spirit or scope of the invention.

The embodiments of the invention in which an exclusive property or privilege is claimed are defined as follows:

1. A composition of matter having improved resistance to the harmful effects of visible and ultraviolet light comprising a thermally stabilized polypropylene and as a light stabilizer for the composition a furnace carbon black which has been heat treated at a temperature of from about 1200° to about 3000° C. under a non-oxidizing atmosphere, said light stabilizer being present in amounts of from about 0.1 to about 2.0 percent by weight based on the weight of the thermally stabilized polypropylene.

2. The composition as defined in claim 1 wherein said light stabilizer is present in amounts of from about 0.25 to about 1.0 percent by weight based on the weight of the thermally stabilized polypropylene.

3. The composition as defined in claim 1 wherein said furnace carbon black has been heat treated at a temperature of about 1200° C.

4. The composition as defined in claim 1 wherein said furnace carbon black has been heat treated at a temperature of about 1350° C.

5. The composition as defined in claim 1 wherein said furnace carbon black has been heat treated at a temperature of about 1500° C.

6. The composition as defined in claim 1 wherein said furnace carbon black has been heat treated at a temperature of about 2700° C.

* * * * *